US011666502B2

(12) United States Patent
Choi et al.

(10) Patent No.: US 11,666,502 B2
(45) Date of Patent: *Jun. 6, 2023

(54) SUPPORTING MODULE AND MOTION ASSISTANCE APPARATUS INCLUDING THE SAME

(71) Applicant: Samsung Electronics Co., Ltd., Suwon-si (KR)

(72) Inventors: Byungjune Choi, Gunpo-si (KR); Se-Gon Roh, Suwon-si (KR); Minhyung Lee, Seoul (KR); Youn Baek Lee, Yongin-si (KR); Hyun Do Choi, Yongin-si (KR); Jeonghun Kim, Hwaseong-si (KR); Jongwon Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 433 days.

This patent is subject to a terminal disclaimer.

(21) Appl. No.: 15/930,852

(22) Filed: May 13, 2020

(65) Prior Publication Data

US 2020/0268587 A1 Aug. 27, 2020

Related U.S. Application Data

(63) Continuation of application No. 15/134,993, filed on Apr. 21, 2016, now Pat. No. 10,695,255.

(30) Foreign Application Priority Data

Nov. 19, 2015 (KR) ........................ 10-2015-0162455

(51) Int. Cl.
*A61H 3/00* (2006.01)
*A61H 1/02* (2006.01)
*F16M 13/04* (2006.01)

(52) U.S. Cl.
CPC ............. *A61H 3/00* (2013.01); *A61H 1/0244* (2013.01); *F16M 13/04* (2013.01);
(Continued)

(58) Field of Classification Search
CPC ........................................................ A61H 3/00
See application file for complete search history.

(56) References Cited

U.S. PATENT DOCUMENTS 517,639 A * 4/1894 Brickner ................... A61F 5/26
128/119.1
551,237 A * 12/1895 Stewart ..................... A61F 5/24
128/100.1
(Continued)

FOREIGN PATENT DOCUMENTS

JP 2006320349 A 11/2006
JP 5161036 B2 3/2013
(Continued)

OTHER PUBLICATIONS

Materials Data Book, 2003, Cambridge University Engineering Department, p. 11 (Year: 2003).
(Continued)

*Primary Examiner* — Michael J Tsai
(74) *Attorney, Agent, or Firm* — Harness, Dickey & Pierce, P.L.C.

(57) ABSTRACT

A supporting module including a supporting frame including a proximal end and a distal end, a connecting plate connected with the distal end of the supporting frame, a sliding plate in contact with one face of the connecting plate, a supporting band connected to both ends of the connecting plate, and an elastic strip configured to connect the sliding plate and the connecting plate is disclosed.

16 Claims, 10 Drawing Sheets

(52) U.S. Cl.
CPC ............... *A61H 2201/165* (2013.01); *A61H 2203/0406* (2013.01); *A61H 2205/088* (2013.01); *A61H 2205/108* (2013.01)

(56) References Cited

U.S. PATENT DOCUMENTS

| | | | | |
|---|---|---|---|---|
| 1,174,757 | A * | 3/1916 | Packer | A61F 5/028 |
| | | | | 450/2 |
| 4,384,372 | A * | 5/1983 | Rector | A41F 9/002 |
| | | | | 224/684 |
| 5,242,379 | A * | 9/1993 | Harris | A61F 5/0111 |
| | | | | 602/65 |
| 6,540,703 | B1 * | 4/2003 | Lerman | A61F 5/0193 |
| | | | | 602/5 |
| 7,431,708 | B2 | 10/2008 | Sreeramagiri | |
| 8,277,401 | B2 | 10/2012 | Hammerslag et al. | |
| 8,652,075 | B2 | 2/2014 | Takahashi et al. | |
| 9,022,958 | B2 | 5/2015 | Shimizu et al. | |
| 10,485,681 | B2 * | 11/2019 | Herr | A61F 2/70 |
| 2002/0161320 | A1 | 10/2002 | Hogg | |
| 2006/0064047 | A1 * | 3/2006 | Shimada | A61F 5/0102 |
| | | | | 602/26 |
| 2008/0066272 | A1 | 3/2008 | Hammerslag et al. | |
| 2008/0195015 | A1 * | 8/2008 | Ingimundarson | A61F 5/0123 |
| | | | | 602/26 |
| 2011/0295169 | A1 * | 12/2011 | Hendricks | A61F 5/028 |
| | | | | 602/19 |
| 2012/0323154 | A1 * | 12/2012 | Ingimundarson | A61F 5/01 |
| | | | | 602/5 |
| 2016/0022528 | A1 | 1/2016 | Wyatt et al. | |

FOREIGN PATENT DOCUMENTS

| | | | | |
|---|---|---|---|---|
| JP | 2013173190 A | | 9/2013 | |
| KR | 20110103530 A | | 9/2011 | |
| KR | 101417895 B1 | | 7/2014 | |
| KR | 10-2015-0055958 A | | 5/2015 | |
| WO | WO-03086248 A1 * | 10/2003 | | A61F 5/0111 |

OTHER PUBLICATIONS

Korean OA issued by Korean Intellectual Property Office (KIPO) dated Mar. 13, 2022 for the corresponding KR Patent Application No. 10-2015-0162455.
Notice of Preliminary Rejection dated Jan. 1, 2023 in Korean Application No. 10-2022-0158119.

\* cited by examiner

SUPPORTING MODULE AND MOTION ASSISTANCE APPARATUS INCLUDING THE SAME

CROSS-REFERENCE TO RELATED APPLICATION

This application is a continuation application of U.S. application Ser. No. 15/134,993, filed on Apr. 21, 2016, which claims under 35 U.S.C. § 119 to Korean Patent Application No. 10-2015-0162455, filed on Nov. 19, 2015, in the Korean Intellectual Property Office, the entire contents of each of which are incorporated herein by reference in its entirety.

BACKGROUND

1. Field

At least one example embodiment relates to a supporting module and/or a motion assistance apparatus including the supporting module.

2. Description of the Related Art

With the onset of rapidly aging societies, a number of people are experiencing inconvenience and/or pain from joint problems. Thus, there is a growing interest in motion assistance apparatuses enabling the elderly and/or patients having joint problems to walk with less effort. The motion assistance apparatuses may include active joint structures including hydraulic systems and/or driving motors to drive each joint portion to improve muscular strength of legs of the users.

SUMMARY

Some example embodiments relate to a support.

In some example embodiments, the support includes a supporting frame having a proximal end and a distal end; a connecting plate configured to connect to the distal end of the supporting frame, the connecting plate having a first end and a second end; a sliding plate configured to contact a rear face of the connecting plate via an elastic force; a supporting band connected to the first end and the second end of the connecting plate; and an elastic strip configured to generate the elastic force to connect the sliding plate and the rear face of the connecting plate.

In some example embodiments, the supporting band includes a first band including a first connector and a second connector, the first connector and the second connector each having a first end and a second end with a flexible material therebetween, the first end of the first connector connected to the first end of the connecting plate and the first end of the second connector connected to the second end of the connecting plate; and a second band having an adjustable length and configured to connect between the second end of the first connector and the second end of the second connector.

In some example embodiments, the first band and the connecting plate are configured to move relative to the sliding plate and the second band when the supporting frame moves.

In some example embodiments, the elastic strip is configured to provide a restoring force to draw the sliding plate toward the connecting plate when the supporting frame moves.

In some example embodiments, the supporting band further includes first rings each configured to connect the connecting plate to respective ones of the first connector and the second connector; and second rings each configured to connect the respective ones of the first connector and the second connector to the second band.

In some example embodiments, the connecting plate has an accepting groove therein, the accepting groove configured to accept the distal end of the supporting frame.

In some example embodiments, the sliding plate has a guide groove therein in a direction perpendicular to the supporting band, and the connecting plate has a protrusion thereon, the protrusion configured to slide into the guide groove.

In some example embodiments, the support the elastic strip is configured to pass through the connecting plate in a longitudinal direction of the supporting band to connect the connecting plate and the sliding plate.

In some example embodiments, the support includes at least one shock absorbing pad attached to an inner side face of one of the sliding plate and the supporting band.

Some other example embodiments also relate to a support.

In some example embodiments, the support includes a supporting frame; a joint frame configured to detachably attach to the supporting frame, the joint frame having an inner side face and an outer side face on opposite sides thereof; and a supporting band having a first end and a second end with a flexible material therebetween, the first end of the supporting band connected to the inner side face of the joint frame, and the second end of the supporting band configured to detachably attach to the outer side face of the joint frame.

In some example embodiments, the joint frame has a joint groove on the inner side face thereof such that the joint frame is configured to accept an end portion of the supporting frame.

In some example embodiments, the joint frame includes at least one fixing rod on the outer side face thereof, and the supporting band has at least one rod hole therein to accept respective ones of the at least one fixing rod.

Some other example embodiments also relate to a support.

In some example embodiments, the support includes a supporting frame; a supporting band having a looped shape and including at least one shock absorbing pad attached to an inner side face thereof; at least one movable wire running on an outer side face of the supporting band in a longitudinal direction of the supporting band; and a connecting plate connected to the at least one movable wire, the connecting plate configured to connect to the supporting frame.

In some example embodiments, the support includes a tube on the outer side face of the supporting band, the tube configured to receive the at least one movable wire such that the at least one movable wire is configured to pass through and move within the tube.

In some example embodiments, the supporting band includes a sliding plate configured to contact with a rear face of the connecting plate, and wherein the connecting plate is configured to move on the sliding plate in at least one of upward, downward, leftward, and rightward directions.

In some example embodiments, the support includes an elastic band configured to draw the sliding plate toward the connecting plate, wherein the connecting plate has a protrusion on the rear face thereof, and the sliding plate has an accepting groove on a front face thereof, the protrusion configured to slide into the accepting groove.

Some other example embodiments relate to a motion assistance apparatus.

In some example embodiments, the motion assistance apparatus includes a fixing device attached to a user; a driver rotatably fixed to the fixing device; and a support configured to support a portion of a body of the user, and to rotate in response to a driving force from the driver.

In some example embodiments, the support includes a supporting frame having a proximal end and a distal end, the proximal end connected to the driver, a supporting band connected to the distal end of the supporting frame, a sliding plate connected to an inner circumferential face of the supporting band via an elastic force, and an elastic strip configured to generate the elastic force to connect the sliding plate and the supporting band.

In some example embodiments, the supporting band includes a connecting plate having a front face and a rear face, the front face of the connecting plate configured to connect to the distal end of the supporting frame, and the rear face of the connecting plate configured to connect to the sliding plate; and a first band including a first connector and a second connector, the first connector and the second connector each having a first end and a second end with a flexible material therebetween, the first end of the first connector connected to the first end of the connecting plate and the first end of the second connector connected to the second end of the connecting plate.

In some example embodiments, when the driver generates the driving force, the supporting frame is configured to move with respect to the sliding plate in a direction perpendicular to the supporting band.

In some example embodiments, the elastic strip is configured to pass through the connecting plate in a longitudinal direction of the supporting band to connect the connecting plate and the sliding plate, and the elastic strip is configured to provide a restoring force to draw the sliding plate toward the connecting plate when the supporting frame moves.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
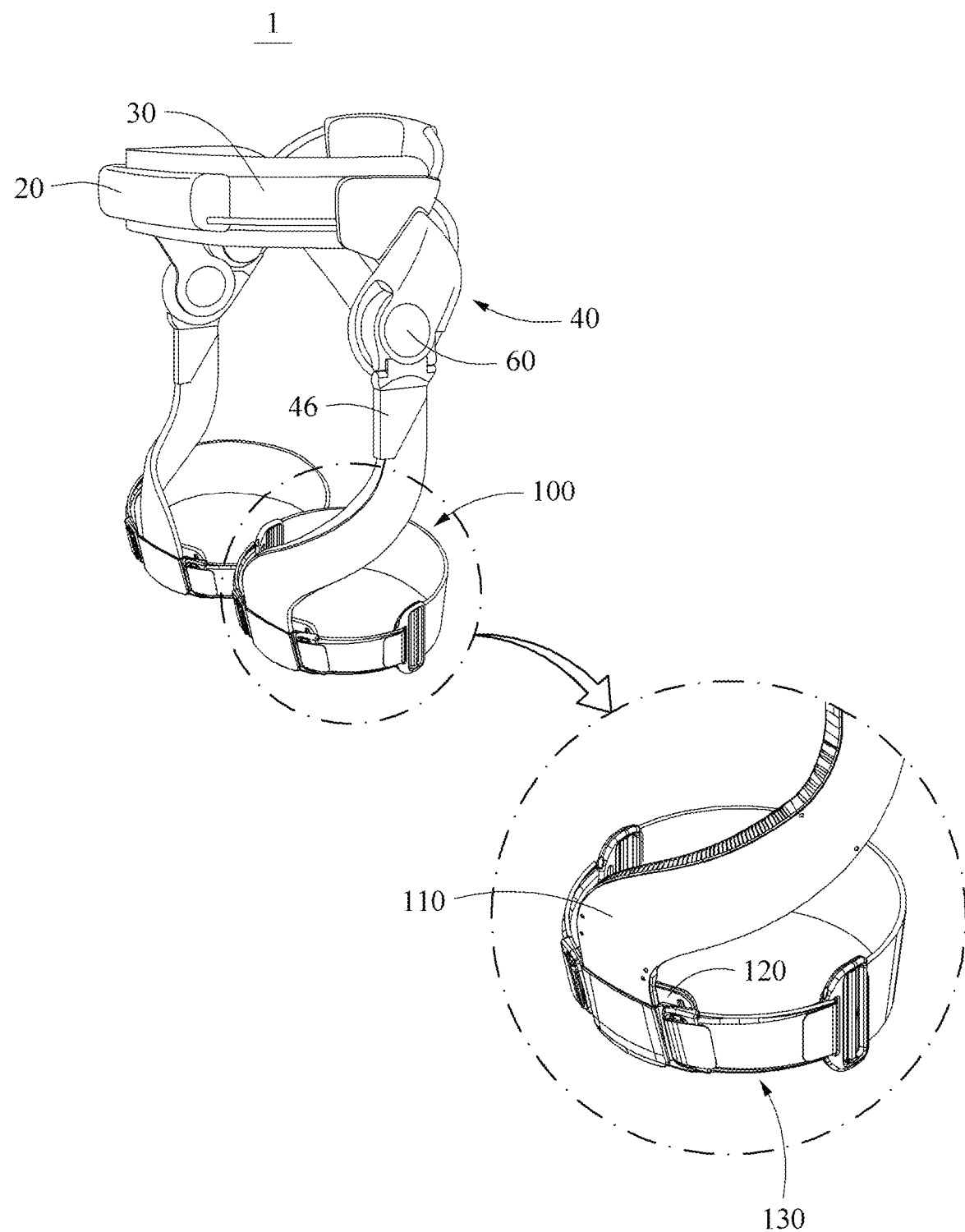
FIG. 1 illustrates an example of a motion assistance apparatus and a supporting module according to some example embodiments.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Various example embodiments will now be described more fully with reference to the accompanying drawings in which some example embodiments are shown. In the drawings, the thicknesses of layers and regions are exaggerated for clarity.

FIG. 1 illustrates a motion assistance apparatus and a supporting module according to some example embodiments.

Referring to FIG. 1, a motion assistance apparatus 1 may be worn by a user to assist a motion of the user. The user may be a human, an animal, or a robot. However, example embodiments are not limited thereto. Further, although FIG. 1 illustrates a case in which the motion assistance apparatus 1 assists a motion of a thigh of the user, the motion assistance apparatus 1 may also assist a motion of another part of an upper body, for example, a hand, an upper arm, and a lower arm of the user, or a motion of another part of a lower body, for example, a foot, and a calf of the user. The motion assistance apparatus 1 may assist a motion of a part of the user. Hereinafter, a case in which the motion assistance apparatus 1 assists a motion of a thigh of a human will be described as an example.

The motion assistance apparatus 1 may include a fixing module 30, a driving module 40, a rotating joint 60, and a supporting module 100. Further, the motion assistance apparatus 1 may include a controller (not shown).

The fixing module 30 may be attached to the user, and configured to cover a portion of an external surface of the user. For example, the fixing module 30 may be attached to one side of a waist of the user, and include a curved surface corresponding to a contact portion of the user.

The driving module 40 may provide power to be transmitted to the rotating joint 60. For example, the driving module 40 may be disposed in a lateral direction of the rotating joint 60, in detail, such that an axis of rotation of the driving module 40 may be spaced apart from an axis of rotation of the rotating joint 60. In this example, when compared to a case in which the driving module 40 and the rotating joint 60 share an axis of rotation, a height of a portion protruding from the user may relatively decrease. The driving module 40 may be disposed to be spaced apart from the rotating joint 60 much more than is illustrated in the drawings. In this example, a power transmitting module may be additionally provided to transmit power from the driving module 40 to the rotating joint 60. The power transmitting module may be a rotary body such as, for example, a gear, or a longitudinal member such as, for example, a wire, a cable, a string, a rubber band, a spring, a belt, and a chain.

The rotating joint 60 may rotate by receiving power from the driving module 40. The rotating joint 60 may assist a motion of a joint portion of the user. The rotating joint 60 may be disposed on one side of the fixing module 30 at a position corresponding to the joint portion of the user. For example, the rotating joint 60 may be disposed on one side of a hip joint of the user. One side of the rotating joint 60 may be connected to the driving module 40, and another side of the rotating joint 60 may be connected to the supporting module 100.

The supporting module 100 may support a part of the user, and assist a motion of the part of the user. The supporting module 100 configured to rotate using rotation power of a joint assembly 46 may include a hinge combination structure combined with the rotating joint 60. In this example, by a hinge axis of the hinge connection structure and an axis of rotation of the rotating joint 60, the supporting module 100 may perform a two degree of freedom (DOF) motion with respect to the fixing module 30.

The supporting module 100 may include a supporting frame 110, a sliding plate 120 and a supporting band 130.

The supporting frame 110 may transmit power to a part of the user. One end portion of the supporting frame 110 may be rotatably connected to the rotating joint 60, and another end portion of the supporting frame 110 may be connected to the supporting band 130 to transmit power to a part of the user. For example, the supporting frame 110 may push or pull a thigh of the user. The supporting frame 110 may extend and be bent in a longitudinal direction of the thigh of the user to cover at least a portion of the circumference of the thigh of the user. The supporting frame 110 may be provided in a shape of the thigh to be in close contact with the thigh, thereby minimizing a degree of separation occurring in an operation.

The one end portion of the supporting frame 110 may be disposed on a side surface of the thigh of the user, and the other portion of the supporting frame 110 may be disposed on a front surface of the thigh of the user. A surface on the side of the one end portion of the supporting frame 110 may be orthogonal to a surface on the side of the other end portion of the supporting frame 110. Through this, the supporting frame 110 may transfer a driving force from an output end of the driving module 40, for example, an actuator, to the thigh of the user as a normal force.

The supporting band 130 may be connected to the other end portion of the supporting frame 110 to apply force to a portion of the user. For example, the supporting band 130 may be disposed along the front surface of the thigh of the user, or in a circumferential direction of the thigh of the user to push or pull the thigh of the user. The supporting band 130 may include a curved surface corresponding to the thigh of the user, and be configured to extend from the other end portion of the supporting frame 110 toward both sides of the supporting frame 110.

The controller (not shown) may include a memory and a processor.

The memory may be a non-volatile memory, a volatile memory, a hard disk, an optical disk, and a combination of two or more of the above-mentioned devices. The memory may be a non-transitory computer readable medium. The non-transitory computer-readable media may also be a distributed network, so that the program instructions are stored and executed in a distributed fashion. The non-volatile memory may be a Read Only Memory (ROM), a Programmable Read Only Memory (PROM), an Erasable Programmable Read Only Memory (EPROM), or a flash memory. The volatile memory may be a Random Access Memory (RAM).

The processor may be implemented by at least one semiconductor chip disposed on a printed circuit board. The processor may be an arithmetic logic unit, a digital signal processor, a microcomputer, a field programmable array, a programmable logic unit, a microprocessor or any other device capable of responding to and executing instructions in a defined manner.

The processor may be programmed with instructions that configure the processor into a special purpose computer to instruct the driving module 40 to generate power and to transmit the generated power, via the rotating joint 60, to the supporting module 100 to move the supporting frame 110 upward or downward, while the sliding plate 120 and the supporting band 130 are in close contact with the body of the user. Thus, the supporting frame 110 may move upward or downward relative to the sliding plate 120 and the supporting band 130.

Figure 2A:
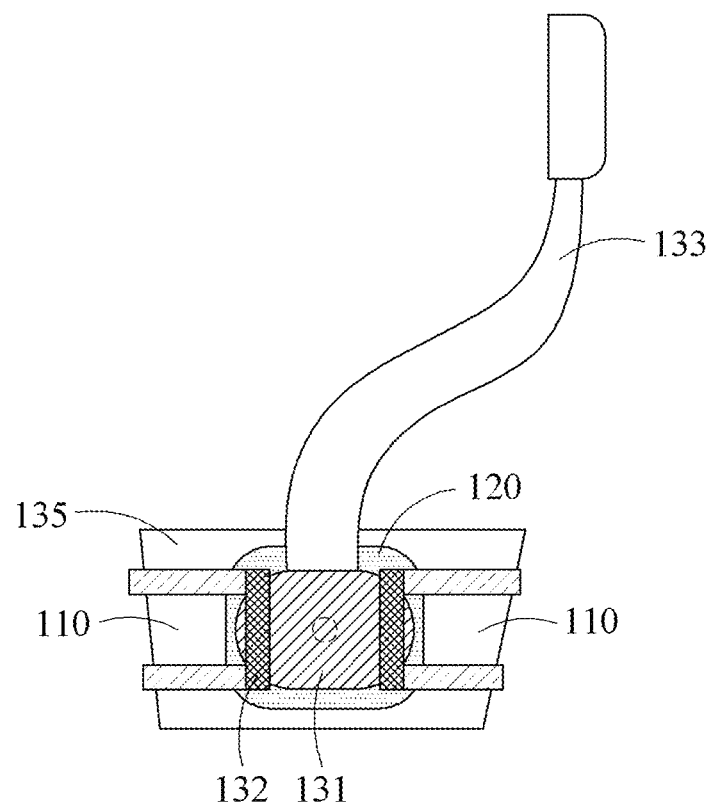
FIGS. 2A and 2B illustrate an example of a supporting module according to some example embodiments.
Figure 2B:
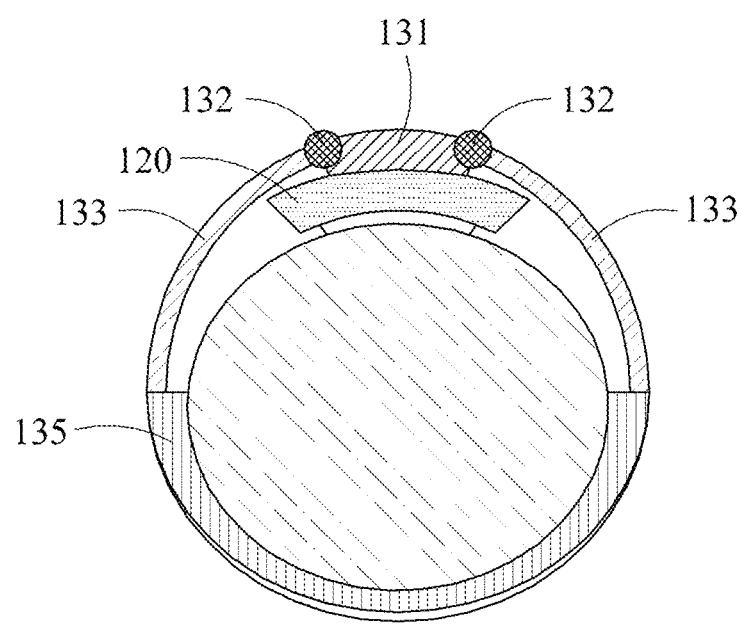

FIGS. 2A and 2B illustrate the supporting module 100 in an assembled state. FIG. 2A is a front side view of the supporting module 100 and FIG. 2B is a bottom view of the supporting module 100.

Referring to FIGS. 2A and 2B, the supporting frame 110 may spirally extend downward from the driving module 40 to the supporting band 130.

The supporting band 130 may include a connecting plate 131 connected to the supporting frame 110. The supporting band 130 may further include two first rings 132 configured to connect the connecting plate 131 and respective connectors 133 that are each attached to different sides of a second band 135.

The connecting plate 131 may move in connection with the supporting frame 110. The connecting plate 131 may be connected with the sliding plate 120. Irrespective of whether the supporting frame 110 moves, a rear face of the connecting plate 131 may be maintained to be in surface contact with a front face of the sliding plate 120.

Both ends of the connecting plate 131 may be connected with two connectors 133 formed with a flexible material. A second band 135 of which a length is adjustable may connect the two connectors 133. The second band 135 may cover a rear portion of a thigh of a user and lift the thigh through the driving module 40.

An inner side face of the second band 135 and a rear face of the sliding plate 120 may be in close contact with the thigh of the user. Thus, a shock absorbing pad may be attached to the inner side face of the second band 135 and to the rear face of the sliding plate 120, thereby providing an increased comfort to the user.

Figure 3:
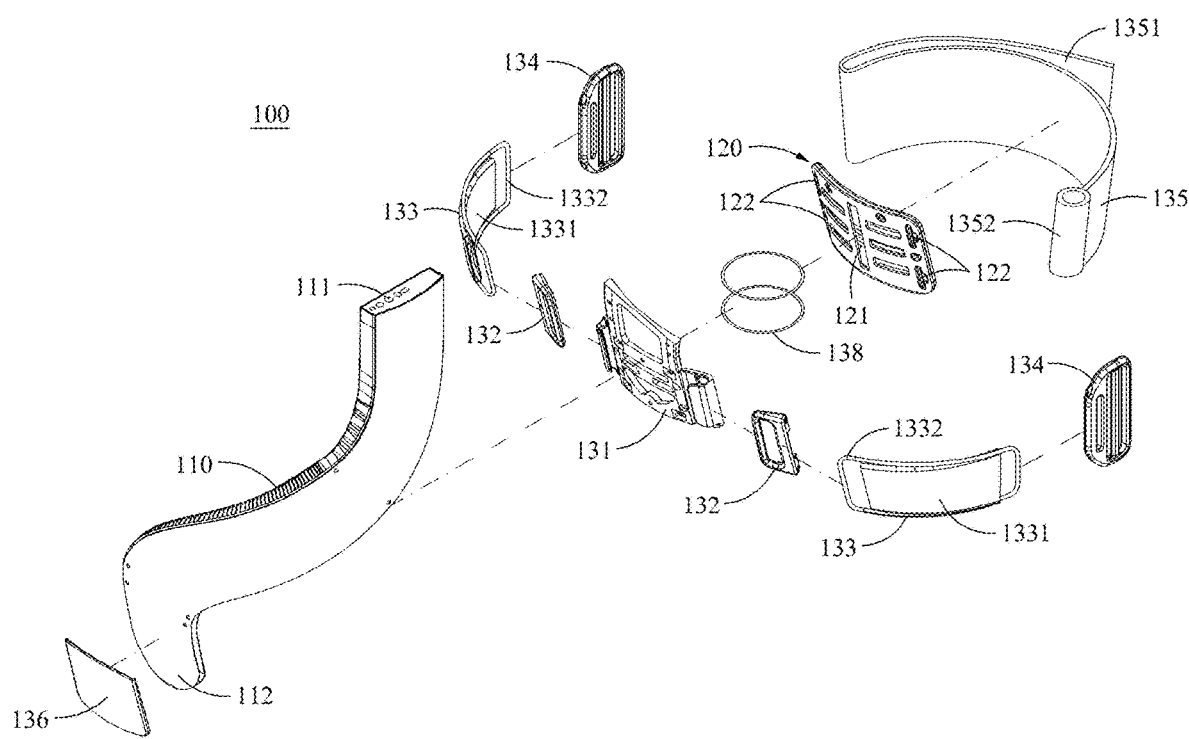
FIGS. 3 and 4 illustrate another example of a supporting module according to some example embodiments.
Figure 4:
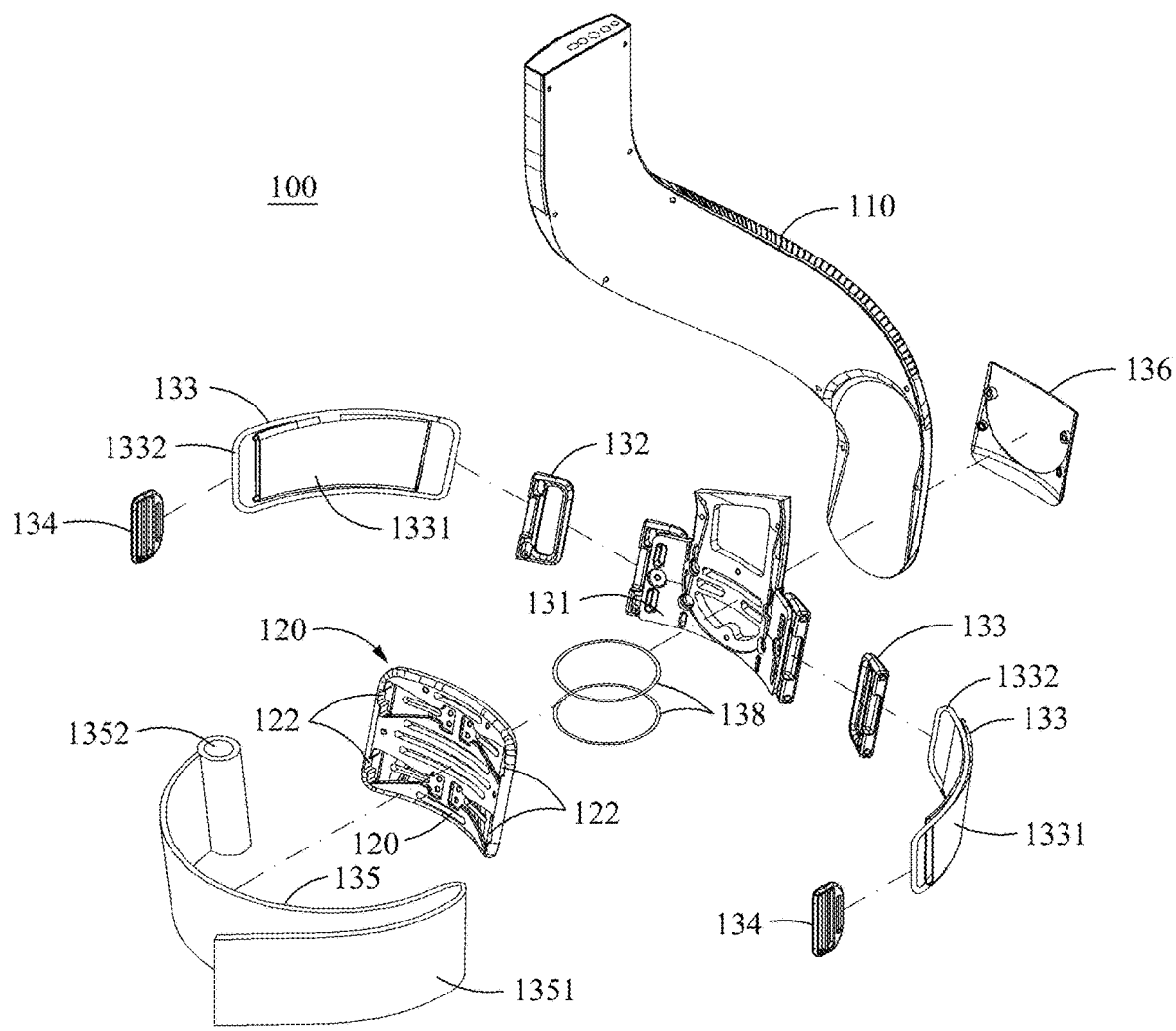

FIGS. 3 and 4 are exploded perspective views of the supporting modules 100. FIG. 3 illustrates an example of the supporting module 100 viewed at the front of the supporting module 100. FIG. 4 illustrates an example of the supporting module viewed at the rear of the supporting module 100.

Referring to FIGS. 3 and 4, the supporting module 100 may include the supporting frame 110, the sliding plate 120 and the supporting band 130.

The supporting frame 110 may have a front end portion 111 and a distal end 112. An outer circumferential face of the supporting band 130 may be connected to the distal end 112 of the supporting frame 110. The sliding plate 120 may be connected to an inner circumferential face of the supporting band 130 via an elastic strip 138 configured to connect the sliding plate 120 and the supporting band 130. The sliding plate 120 may be configured to move relative to the supporting band 130.

The supporting frame 110 and the supporting band 130 may be connected through a plane joint corresponding to a connection scheme of the sliding plate 120 and the connecting plate 131. The plane joint may minimize a protruding length of the supporting band 130, thereby forming a structure having a size wearable in clothes of the user.

The supporting band 130 may be configured in a form of loop. The distal end 112 of the supporting frame 110 may be connected to the outer circumferential face of the supporting band 130. The sliding plate 120 may be connected to an inner face side of a portion of the supporting band 130 by the elastic strip 138. In this example, the portion of the supporting band 130 may be connected to the supporting frame 110.

The supporting band 130 may include the connecting plate 131, the first rings 132, the connectors 133, second rings 134, and the second band 135.

The connecting plate 131 may have a front face connected to the distal end 112 of the supporting frame 110 and a rear face connected to the sliding plate 120. The second band 135 may have an adjustable length and be connected to both ends of a first band.

The connector 133 may include a fabric band 1331 formed with an elastic material and a connector wire 1332 fixed to the fabric band 1331 along an outer border of the fabric band 1331. The fabric band 1331 and the connector wire 1332 may have elasticity and thus, be bent by an external force.

The connecting plate 131 may include a first end and a second end each connected to a respective one of the connectors 133 that are formed with a flexible material. For example, the first end and the second end of the connecting plate 131 may be connected respective ones of the first rings 132, and each of the first rings 132 may be connected to respective a first end of respective ones of the flexible connectors 133. A second end of each of the flexible connectors 133 may be connected, via a respective second ring 134, to the second band 135.

For example, one end of the connector wire 1332 may be connected to a rear end of the first ring 132, and the other end of the connector wire 1332 may be connected to a head end of the second ring 134. The front end of the second ring 134 may include a slot and thus, the connector wire 1332 may pass through the slot.

Based on the connecting plate 131, the two first rings 132 may be symmetrical to each other, the two second rings 134 may be symmetrical to each other, and the two connectors 133 may be symmetrical to each other.

The second band 135 may include a proximal end and a distal end. The proximal end of the second band 135 may include a band ring 1352 to be connected to the first band. The tail portion of the second band 135 may include a length adjuster 1351 including a hook and loop fastener configured to be folded at a central portion of the distal end.

Two slots may be longitudinally formed at a tail end of the second rings 134 to insert the band ring 1352 or the length adjuster 1351. For example, a tail end of a first one of the second rings 134 may be connected with the band ring 1352 of the second band 135, and a tail end of a second one of the second rings 134 may have the length adjuster 1351 of the second band 135 pass therethrough. The length adjuster 1351 may pass through an outer slot of two slots of the second rings 134 toward a center of the supporting band 130, and pass through an inner slot of the two slots at the tail ends of the second rings 134 in a direction separating from the center of the supporting band 130.

The connecting plate 131 may include an accepting groove configured to accept the distal end 112 of the supporting frame 110. The accepting groove may be formed in a shape corresponding to the distal end 112 of the supporting frame 110 to firmly accept the distal end 112 of the supporting frame 110 and prevent separation of the distal end 112.

A front face of the connecting plate 131 may be connected with a cover 136. A rear face of the connecting plate 131 may be connected with the sliding plate 120 by the elastic strip 138. The elastic strip 138 may connect the sliding plate 120 to the connecting plate 131 in a tensed state and thus, a tensile force may be exerted between the sliding plate 120 and the connecting plate 131.

The sliding plate 120 may include a guide groove 121 in a direction perpendicular to the supporting band 130 and strip slots 122 may be formed on both sides of the sliding plate 120 to fix the elastic strip 138. The connecting plate 131 may include a protrusion insertable in the guide groove 121. The guide groove 121 may assist the connecting plate 131 to translationally move on a surface of the sliding plate 120 in a direction perpendicular to a longitudinal direction of the supporting band 130 in lieu of moving in the longitudinal direction of the supporting band 130.

At least one shock absorbing pad may be attached to an inner side face of the sliding plate 120 or an inner side face of the supporting band 130 to increase a frictional force and reduce a shock applied to an inner side.

Figure 5A:
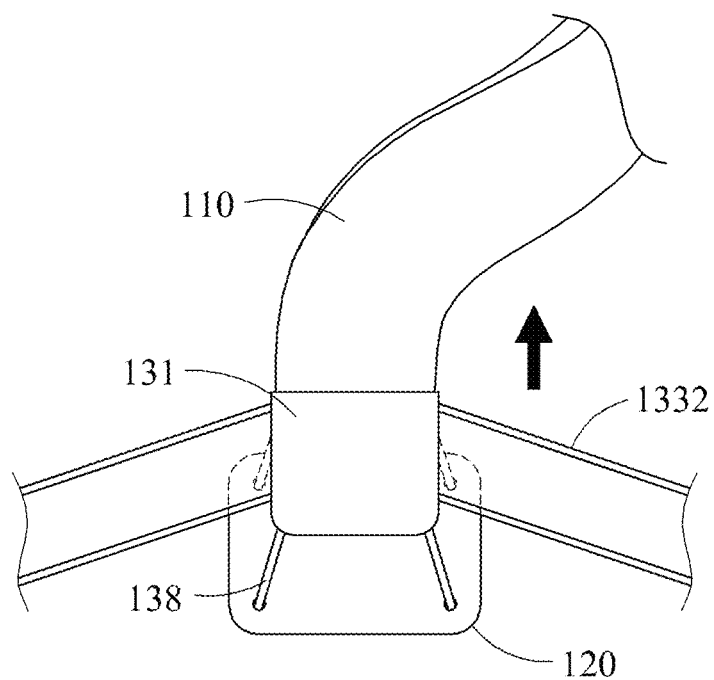
FIGS. 5A and 5B illustrates an example of an operation of a supporting module according to some example embodiments.
Figure 5B:
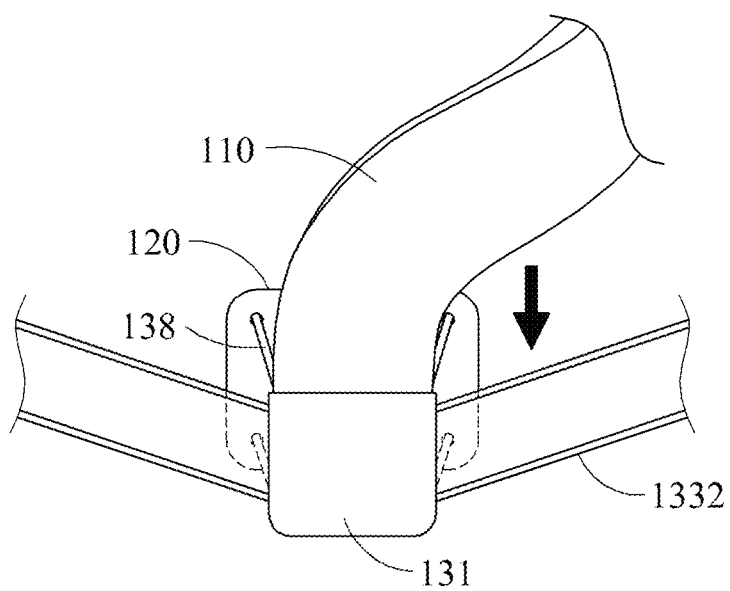

FIGS. 5A and 5B are perspective views illustrating an example of the supporting module 100. FIGS. 5A and 5B illustrate a case in which a user is wearing the supporting modules 100, and an inner circumferential face of the supporting band 130 may be in contact with a thigh of the user.

Referring to FIGS. 5A and 5B, the first band may move the supporting frame 110 relative to the sliding plate 120 and the second band 135. In response to a movement of the supporting frame 110, the elastic strip 138 may provide a restoring force to prevent the sliding plate 120 separating from the connecting plate 131.

Strip slots 122 may be formed on both sides of the sliding plate 120 to fix the elastic strip 138. When the elastic strip 138 passes through the connecting plate 131 and the strip slots 122 of the sliding plate 120 in a longitudinal direction of the supporting band 130, the elastic strip 138 may connect the connecting plate 131 and the sliding plate 120.

FIG. 5A illustrates an example in which the supporting frame 110 pulls the connecting plate 131 upward relative to the sliding plate 120 based on various motions of a user. When the connecting plate 131 is pulled upward, a frictional force may be exerted on the sliding plate 120 and the second band 135 with respect to the thigh and thus, may not be pulled upward dissimilarly to the connecting plate 131.

The elastic strip 138 may extend by a distance to which the connecting plate 131 separates from the sliding plate 120 and thus, exert a restoring force to relocate the connecting plate 131 to an original position. The elastic strip 138 may be formed in a shape of, for example, a parallelogram while moving upward.

Also, the connector wire 1332 of the connector 133 may also be formed in a shape of, for example, the parallelogram while moving upward. The connector wire 1332 may have elasticity. Thus, the connector wire 1332 may exert the restoring force on the connecting frame 131 by a length to which a diagonal of the parallelogram is elongated at a level length in a longitudinal direction of the supporting band 130.

FIG. 5B illustrates an example in which the supporting frame 110 pushes the connecting plate 131 downward relative to the sliding plate 120 based on various motions of a user. In this example, the elastic strip 138 and the connector wire 1332 may extend to be in the shape of the parallelogram, and exert the restoring force in an upward direction relative to the connecting plate 131.

When the supporting module 100 is applied to the motion assistance apparatus 1, a compensation for a change in length resulting from, for example, walking and various motions may be allowed. The connecting plate 131 may be provided in a form of passive joint configured to move relative to the sliding plate 120. Thus, when various motions, for example, an adduction motion, and walking including a sitting down motion, a standing up motion, a stepping up motion, and a stepping down motion, are performed, a position of the supporting band 130 may change while minimizing an inconvenience and a resistance which the user may experience in response to the change in the position.

Figure 6:
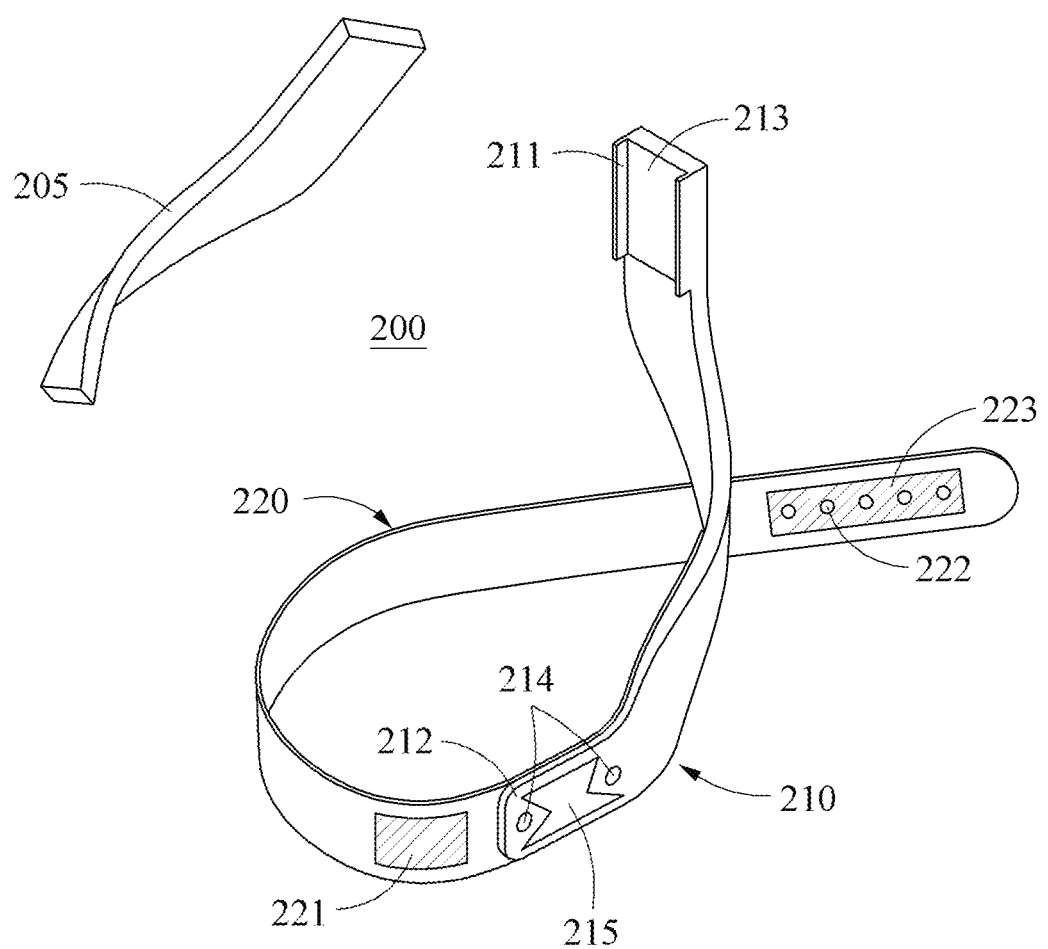
FIG. 6 illustrates still another example of a supporting module according to some example embodiments.

FIG. 6 is a perspective diagram illustrating a supporting module according to other example embodiments.

Referring to FIG. 6, a supporting module 200 may include a supporting frame 205, a joint frame 210 attachable to and detachable from the supporting frame 205, and a supporting band 220 formed with a flexible material.

One end of the supporting band 220 may be connected with an inner side face of the joint frame 210 and the other end of the supporting band 220 may extend from the one end in a lateral direction to be attached to and detached from an outer side face of the joint frame 210.

The joint frame 210 may extend in a lateral direction, and then spirally twist and extend in a longitudinal direction. The joint frame 210 may have the same form as a lower end portion of the supporting frame 110 of the supporting module 100 discussed supra with regards to FIGS. 1 to 5B. The supporting band 220 may be connected with a portion between a middle portion and a lower end portion of an inner side face of the joint frame 210 using an adhesive or a hook and fastener.

A portion of the joint frame 210 may extend upward, and a length of the supporting frame 205 may be adjusted based on the extended portion of the joint frame 210. Thus, the supporting frame 205 of the supporting module 200 may be formed to be shorter than the supporting frame 110 of the supporting modules 100.

The supporting band 220 may spirally extend downward from the middle portion of the joint frame 210 to the lower end portion of the joint frame 210. When the supporting band 220 extends to a lowermost end portion of the joint frame 210, the supporting band 220 may extend in the lateral direction. The supporting band 220 may extend to have a sufficient length corresponding to various circumferences of a thigh of a user.

The joint frame 210 may include a joint groove 213 formed on the inner side face of the joint frame 210 to accept an end portion of the supporting frame 205. The joint frame 210 may also include at least one fixing rod 214 formed on an outer side face of the joint frame 210. A joint guide 211 may be formed at an upper end of the joint frame 210 such that the joint frame 210 is readily attached to and detached from the supporting frame 205. A loop and fastener 215 may be attached between the fixing rods 214 of the joint frame 210 to fix the other end of the supporting band 220.

The supporting band 220 may include at least one rod hole 222 formed on the inner side face of the supporting band 220 to accept the fixing rod 214. A nonwoven fabric 223 may be attached to the inner side face of the other end of the supporting band 220 to be attached to the hook and fastener 215. The supporting module 200 is provided in a simple structure including overall two parts and thus, a user may easily wear and remove the supporting module 200 with one hand.

A close-contact plate 221 may be attached to the outer side face of the supporting band 220 disposed adjacent to the lower end portion of the joint frame 210. The close-contact plate 221 may be formed with a nitinol material or a carbon steel material. The nitinol material and the carbon steel material may be shape memory alloy materials. Thus, the nitinol material or the carbon steel material may allow the supporting band 220 to have a restoring force such that the supporting band 220 is restored to be in an original shape from a tensed state. The close-contact plate 221 may be additionally attached to a portion adjacent to the nonwoven fabric 223.

Figure 7A:
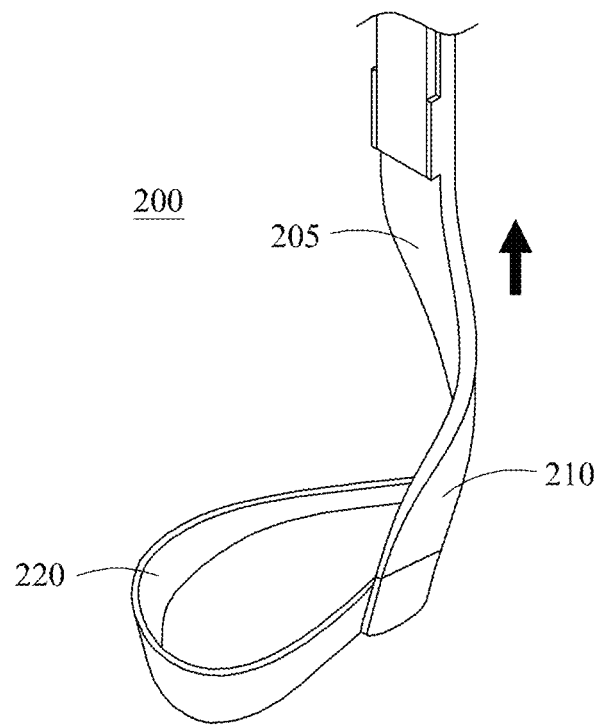
FIGS. 7A and 7B illustrate another example of an operation of a supporting module according to some example embodiments.
Figure 7B:
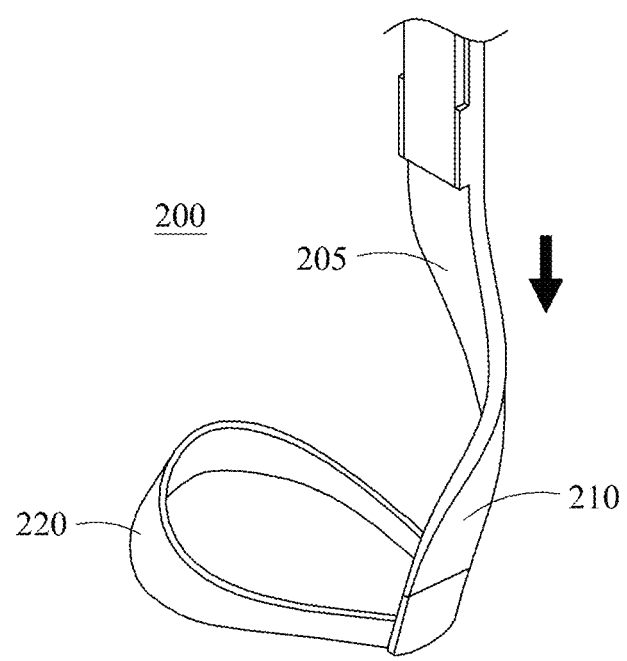

FIGS. 7A and 7B illustrate an example of an operation of the supporting module 200. FIG. 7A illustrates an example in which the supporting frame 205 is pulled upward. FIG. 7B illustrates an example in which a force is applied to the supporting frame 205 to be pushed downward.

Referring to FIGS. 7A and 7B, the supporting band 220 may be formed with an elastic material, and the joint frame 210 may be formed with a hard material.

In response to the supporting frame 205 pulled upward as illustrated in FIG. 7A, a portion of the supporting band 220 connected with the joint frame 210 may also be pulled upward. Conversely, in response to the supporting frame 205 pushed downward as illustrated in FIG. 7B, a portion of the supporting band 220 connected with the joint frame 210 may also be pushed downward.

A portion of the supporting band 220 disposed on an opposite side of the portion connected with the joint frame 210 may not move upward or downward due to a frictional force with respect to a thigh of a user. The supporting band 220 may have elasticity. Thus, when a force is applied to the supporting frame 205, the portion of the supporting band 220 connected with the joint frame 210 may be elongated to allow the supporting frame 205 to easily perform translational movement.

A portion including the close-contact plate 221 formed with a metal material on the supporting band 220 may not be tensed. Thus, the portion of the supporting band 220 connected with the joint frame 210 may be tensed in a shape of parallelogram and move in a vertical direction when the supporting frame 205 moves upward or downward.

Figure 8A:
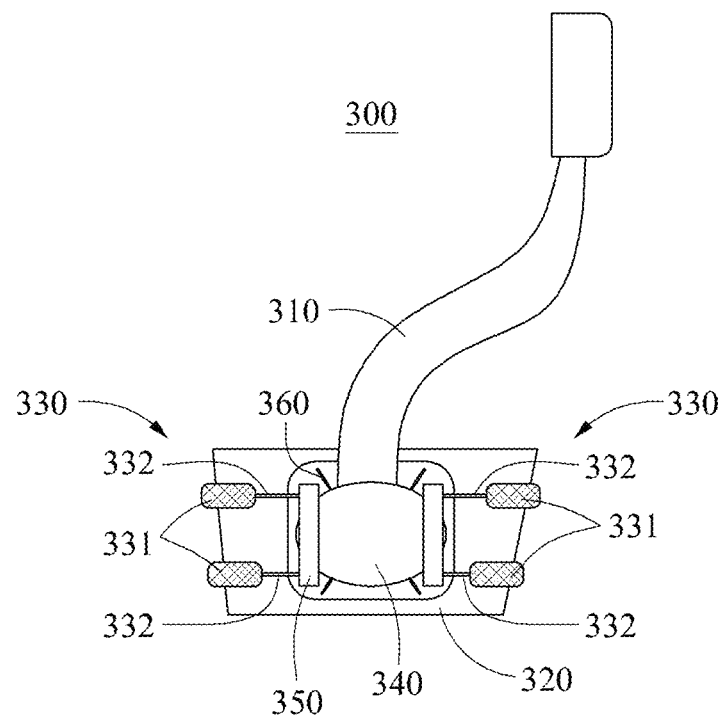
FIGS. 8A and 8B illustrate yet another example of a supporting module according to some example embodiments.
Figure 8B:
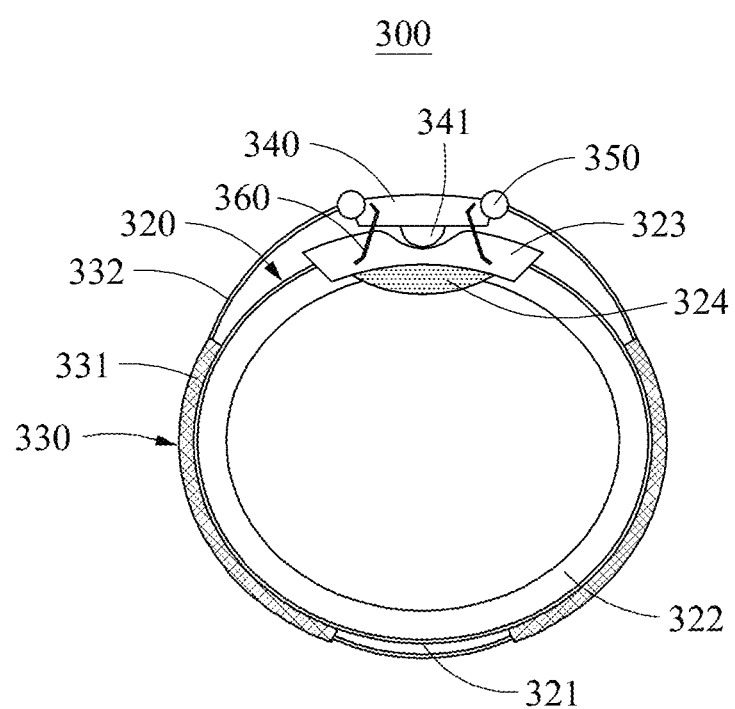

FIGS. 8A and 8B illustrate a supporting module according to other example embodiments.

Referring to FIGS. 8A and 8B, in the example embodiments discussed above with regard to FIGS. 1-5B, the supporting modules 100 may include the supporting band 130 configured as one layer. In contrast, in other example embodiments, a supporting module 300 may include a supporting band 320 on which a movable wire 332 is disposed and thus, be configured with two layers 330.

The supporting module 300 may include the supporting band 320 formed in a loop shape and having an inner side face on which a shock absorbing pad 322 is attached. The supporting module 300 may further include the movable wire 332 movably fixed on an outer side face of the supporting band 320 and configured to cover the supporting band 320 in a longitudinal direction of the supporting band 320, and a connecting plate 340 connected to the movable wire 332. In this example, the supporting frame 310 may be fixed to the connecting plate 340.

When the supporting band 320 is attached to a thigh of a user, the supporting band 320 may not move in a vertical direction until the supporting band 320 is detached from the thigh. Thus, the shock absorbing pad 322 may need to be provided to an inner side of the supporting band 320. The shock absorbing pad 322 may increase a frictional force between the supporting band 320 and the thigh of the user such that the supporting band 320 is firmly attached to the thigh. Also, the shock absorbing pad 322 may minimize a rubbed degree to increase a comfort of the user.

In some example embodiments, to fix the movable wire 332 to the supporting band 320, a tube 331 may be fixed on the outer side face of the supporting band 320. A portion of the movable wire 332 may pass though the tube 331 and move in the tube 331. The tube 331 and the movable wire 332 may be disposed on the outer side face of the supporting band 320 in a form of two columns. On an inner side face of the tube 331, lubricant may be applied to reduce a friction with the movable wire 332.

In other example embodiments, the movable wire 332 may pass through the supporting band 320 in proximity to the portion on which the connecting plate 340 is disposed such that the movable wire 332 may be fixed to the supporting band 320 without need to use the tube 331.

In an example, the wire 332 may be formed with an inflexible and hard material. For example, a Dyneema wire applied to bulletproof products may be used as the movable wire 332. Since the movable wire 332 is inflexible, the movable wire 332 may be set to be longer than the supporting band 320.

A wire connector 350 may be disposed between an end of the movable wire 332 and the connecting plate 340 to fix the movable wire 332. The movable wire 332 may pass through the wire connector 350 in a direction perpendicular to the supporting band 320.

A sliding plate 323 may be disposed on a central portion of the supporting band 320 to be in contact with a rear face of the connecting plate 340. The connecting plate 340 may move on the sliding plate 323 in at least one of upward, downward, leftward, and rightward directions. In this example, the connecting plate 340 may move relative to the sliding plate 323.

The connecting plate 340 and the sliding plate 323 may be connected to each other by an elastic band 360. Based on an elastic force of the elastic band 360, the rear face of the connecting plate 340 and a front face of the sliding plate 323 may be in close contact with each other.

The connecting plate 340 may include a protrusion 341 disposed on the rear face of the connecting plate 340. The sliding plate 323 may include an accepting groove formed on the front face of the sliding plate 323. The protrusion 341 may be in contact with the accepting groove of the sliding plate 323. The accepting groove of the sliding plate 323 may function as, for example, a guide to restrict a moving range of the connecting plate 340.

Figure 9A:
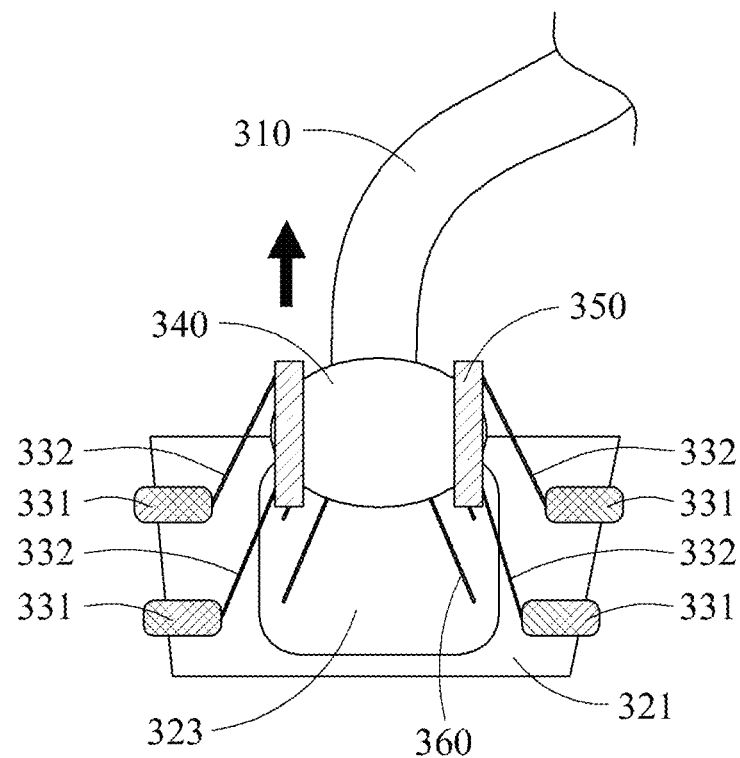
FIGS. 9A through 10B illustrate still another example of an operation of a supporting module according to some example embodiments.
Figure 9B:
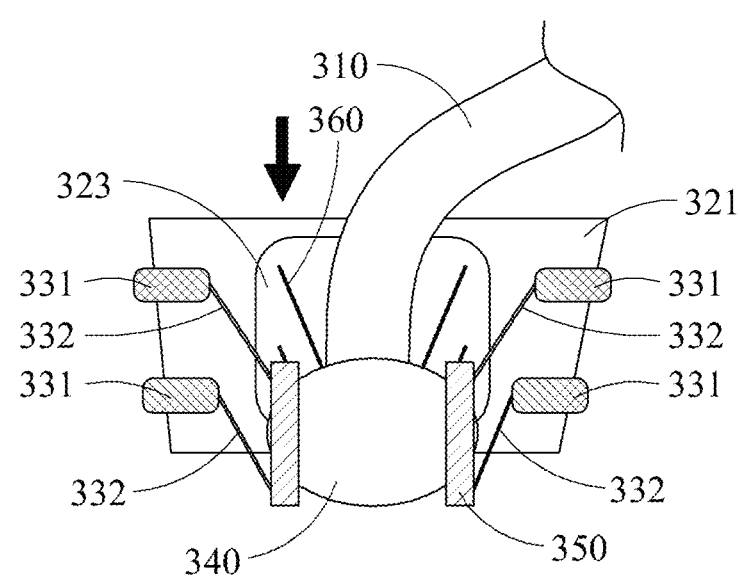
Figure 10A:
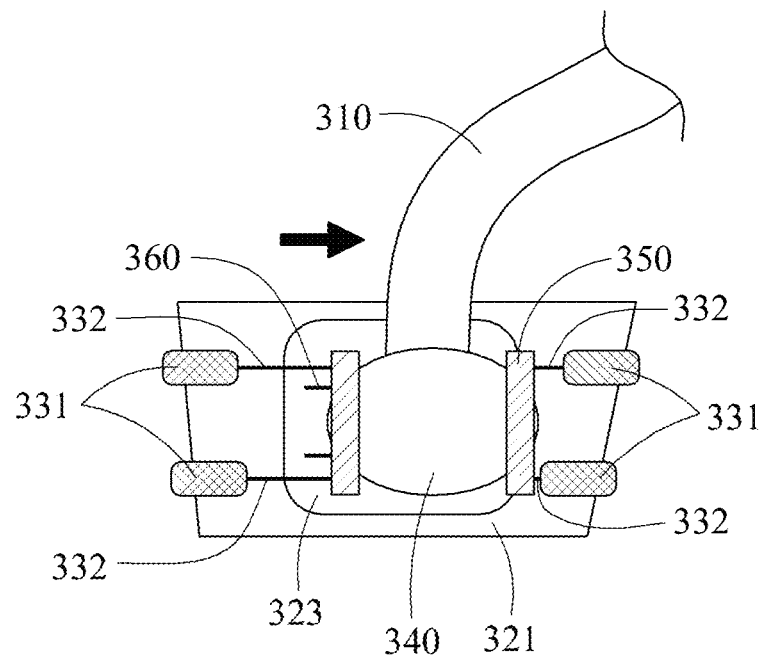
Figure 10B:
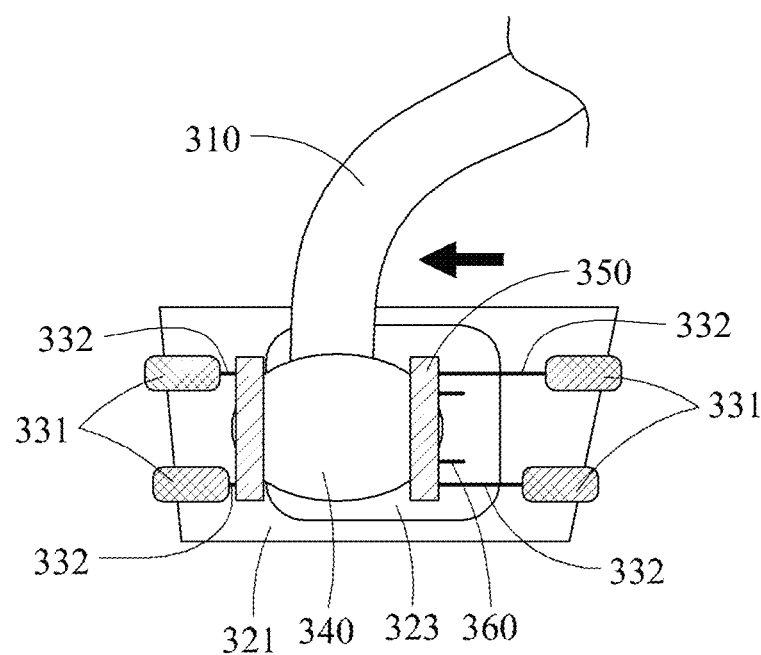

FIGS. 9A through 10B illustrate an example of an operation of the supporting module 300. FIG. 9A illustrates an example in which the supporting frame 310 is pulled upward. FIG. 9B illustrates an example in which the supporting frame 310 is pushed downward. FIG. 10A illustrates an example in which the supporting frame 310 moves rightward. FIG. 10B illustrates an example in which the supporting frame 310 moves leftward.

FIGS. 9A and 9B illustrate an example in which the supporting frame 310 and the connecting plate 340 move in response to a motion of a user lifting or lowering a leg in a forward or backward direction, or a motion of a user spreading or bringing legs together.

The elastic band 360 may continually apply a force to maintain a close contact between the connecting plate 340 and the sliding plate 323 and thus, the connecting plate 340 and the sliding plate 323 may not move in a direction of separating from each other. Through this, despite the connecting plate 340 moving on the sliding plate 323, a portion of the rear face of the connecting plate 340 may be consistently in contact with the front face of the sliding plate 323.

Also, when the connecting plate 340 moves on the sliding plate 323, the elastic band 360 may apply a restoring force in a direction opposite to a moving direction. After the motion of the user, the restoring force may be applied to rearrange the connecting plate 340 on the sliding plate 323 to be in an original state.

Referring to FIGS. 9A and 9B, the wire 332 may be changed into a form of parallelogram in response to the connecting plate 340 moving upward or downward. A distance increasing when the wire 332 arranged in a lateral direction is rearranged in a diagonal direction may be shorter than a distance obtained by subtracting a length of the supporting band 320 from an entire length of the wire 332. Thus, the connecting plate 340 may not move upward or downward in the range of the entire length of the wire 332.

FIGS. 10A and 10B illustrate an example in which the supporting frame 310 and the connecting plate 340 move in response to a motion of a user twisting a leg. As an example, when the user is wearing the supporting module 300 on a right leg, FIG. 10A corresponds to a motion of outwardly twisting the right leg and FIG. 10B corresponds to a motion of inwardly twisting the right leg.

In FIG. 10A, the connecting plate 340 may translationally move from a right side to a left side on the sliding plate 323. In FIG. 10B, the connecting plate 340 may translationally move from the left side to the right side on the sliding plate 323. In this example, the wire 332 may move in the tube 331 in a longitudinal direction of the wire 332.

When circumstances corresponding to FIGS. 9A through 10B occur simultaneously, the connecting plate 340 may translationally move on the sliding plate 323 in the diagonal direction.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A support comprising:
    a supporting frame having a proximal end and a distal end;
    a connecting plate configured to connect to the distal end of the supporting frame, the connecting plate having a first end and a second end;
    a sliding plate configured to contact the connecting plate;
    a supporting band connected to the first end and the second end of the connecting plate; and
    an strip configured to connect the sliding plate and the connecting plate, wherein
    the supporting frame is configured to move relative to the sliding plate along a first direction and a second direction intersecting the first direction.

2. The support of claim 1, wherein the supporting band comprises:
    a first band including a first connector and a second connector, the first connector and the second connector each having a first end and a second end with a flexible material therebetween, the first end of the first connector connected to the first end of the connecting plate and the first end of the second connector connected to the second end of the connecting plate; and
    a second band having an adjustable length and configured to connect between the second end of the first connector and the second end of the second connector.

3. The support of claim 2, wherein the first band and the connecting plate are configured to move relative to the sliding plate and the second band when the supporting frame moves.

4. The support of claim 2, wherein the strip is configured to provide a restoring force to draw the sliding plate toward the connecting plate when the supporting frame moves.

5. The support of claim 2, wherein the supporting band further comprises:
    first rings each configured to connect the connecting plate to respective ones of the first connector and the second connector; and
    second rings each configured to connect the respective ones of the first connector and the second connector to the second band.

6. The support of claim 2, wherein the connecting plate has an accepting groove therein, the accepting groove configured to accept the distal end of the supporting frame.

7. The support of claim 6, wherein
    the sliding plate has a guide groove therein in a direction perpendicular to the supporting band, and
    the connecting plate has a protrusion thereon, the protrusion configured to slide into the guide groove.

8. The support of claim 3, wherein the strip is configured to pass through the connecting plate to connect the connecting plate and the sliding plate.

9. The support of claim 1, further comprising:

at least one shock absorbing pad attached to an inner side face of one of the sliding plate and the supporting band.

10. A support comprising:

a supporting frame;

a supporting band having a looped shape and including at least one shock absorbing pad attached to an inner side face thereof;

at least one movable wire running on an outer side face of the supporting band in a longitudinal direction of the supporting band; and a connecting plate connected to the at least one movable wire, the connecting plate configured to connect to the supporting frame, and to move relative to the supporting band along a first direction and a second direction intersecting the first direction.

11. The support of claim 10, further comprising:

a tube on the outer side face of the supporting band, the tube configured to receive the at least one movable wire such that the at least one movable wire is configured to pass through and move within the tube.

12. The support of claim 11, wherein the supporting band comprises:

a sliding plate configured to contact with a rear face of the connecting plate, and wherein the connecting plate is configured to move on the sliding plate in at least one of upward, downward, leftward, and rightward directions.

13. The support of claim 12, further comprising:

an elastic band configured to draw the sliding plate toward the connecting plate, wherein the connecting plate has a protrusion on the rear face thereof, and the sliding plate has an accepting groove on a front face thereof, the protrusion configured to slide into the accepting groove.

14. A motion assistance apparatus comprising:

a fixing device configured to attach to a user;

a driver rotatably fixed to the fixing device; and a support configured to support a portion of a body of the user, and to rotate in response to a driving force from the driver, the support including, a supporting frame having a head end portion and a tail end portion, the head end portion connected to the driver, a supporting band connected to the tail end portion of the supporting frame, a sliding plate connected to an inner circumferential face of the supporting band via an elastic force, and an elastic strip configured to generate the elastic force to connect the sliding plate and the supporting band, wherein the supporting frame is configured to move relative to the sliding plate along a first direction and a second direction intersecting the first direction when the driver generates the driving force, the first direction and the second direction being perpendicular to the supporting band.

15. The motion assistance apparatus of claim 14, wherein the supporting band comprises:

a connecting plate having a front face and a rear face, the front face of the connecting plate configured to connect to the tail end portion of the supporting frame, and the rear face of the connecting plate configured to connect to the sliding plate; and a first band including a first connector and a second connector, the first connector and the second connector each having a first end and a second end with a flexible material therebetween, the first end of the first connector connected to the first end of the connecting plate and the first end of the second connector connected to the second end of the connecting plate.

16. The motion assistance apparatus of claim 15, wherein the elastic strip is configured to pass through the connecting plate in a longitudinal direction of the supporting band to connect the connecting plate and the sliding plate, and the elastic strip is configured to provide a restoring force to draw the sliding plate toward the connecting plate when the supporting frame moves.

\* \* \* \* \*